(12) United States Patent
Jahn et al.

(10) Patent No.: US 9,273,782 B2
(45) Date of Patent: Mar. 1, 2016

(54) LEAF SEAL

(71) Applicant: ROLLS-ROYCE PLC, London (GB)

(72) Inventors: Ingo Henry Johannes Jahn, Queensland (AU); Gervas Franceschini, Derby (GB)

(73) Assignee: ROLLS-ROYCE plc, London (GB)

( * ) Notice: Subject to any disclaimer, the term of this patent is extended or adjusted under 35 U.S.C. 154(b) by 114 days.

(21) Appl. No.: 13/857,461

(22) Filed: Apr. 5, 2013

(65) Prior Publication Data

US 2014/0070496 A1 Mar. 13, 2014

(30) Foreign Application Priority Data

May 4, 2012 (GB) ..................................... 1207837

(51) Int. Cl.
*F01D 11/02* (2006.01)
*F16J 15/32* (2006.01)

(52) U.S. Cl.
CPC .................................. *F16J 15/3292* (2013.01)

(58) Field of Classification Search
USPC ................ 277/355, 411, 412; 415/174.2, 174
See application file for complete search history.

(56) References Cited

U.S. PATENT DOCUMENTS

| | | | |
|---|---|---|---|
| 6,267,381 B1* | 7/2001 | Wright ........................... 277/355 |
| 6,343,792 B1* | 2/2002 | Shinohara et al. ............ 277/355 |
| 7,828,297 B2* | 11/2010 | Hoebel et al. ................. 277/412 |
| 8,025,296 B2* | 9/2011 | Uehara et al. ................. 277/412 |
| 8,393,859 B1* | 3/2013 | Dillon ......................... 415/173.5 |
| 8,585,058 B2* | 11/2013 | Rhodes et al. ................ 277/355 |
| 8,608,174 B2* | 12/2013 | Kono ............................. 277/355 |
| 2008/0007008 A1 | 1/2008 | Hoebel et al. |
| 2008/0107525 A1 | 5/2008 | Adis et al. |
| 2009/0322038 A1* | 12/2009 | Wright .......................... 277/551 |
| 2011/0135453 A1* | 6/2011 | Howes ........................ 415/171.1 |
| 2012/0007318 A1 | 1/2012 | Lee et al. |
| 2012/0093633 A1* | 4/2012 | Kasibhotla et al. ......... 415/173.3 |

FOREIGN PATENT DOCUMENTS

| | | |
|---|---|---|
| DE | 10 2007 050 503 A1 | 5/2008 |
| EP | 1 876 379 A1 | 1/2008 |
| WO | WO 2006/016098 A1 | 2/2006 |
| WO | WO 2006/061324 A1 | 6/2006 |

OTHER PUBLICATIONS

European Search Report issued in Application No. 13 16 2473; Dated Oct. 3, 2013.
British Search Report issued in Application No. 1207837.4; Dated Aug. 2, 2012.

* cited by examiner

*Primary Examiner* — Kristina Fulton
*Assistant Examiner* — Eugene G Byrd
(74) *Attorney, Agent, or Firm* — Oliff PLC (57) ABSTRACT

A leaf seal for effecting a seal between two, coaxial, relatively rotating components. The leaf seal has an annular pack of stacked leaves. The pack is mountable to a first one of the components with interleaf gaps formed between working portions of neighbouring leaves. The leaves extend towards the other component such that end edges of leaf working portions are presented for wiping contact with the other component. At least adjacent its end leaf edge, each leaf has a rear section at or adjacent the low pressure side of the pack and a front section which extends from the rear section to the high pressure side of the pack. The rear sections of the leaves are thicker than their respective front sections to reduce the interleaf gaps at the rear sections such that most of the pressure drop across the pack is over the rear sections.

17 Claims, 14 Drawing Sheets

LEAF SEAL

FIELD OF THE INVENTION

The present invention relates to a leaf seal.

BACKGROUND OF THE INVENTION

Leaf seals may be used to form a seal between two relatively rotating components in order to maintain a relatively high pressure on one side of the seal and a relatively low pressure on the other. A leaf seal is arranged with a large number of typically rectangular leaves which are held at a defined angle to the radial all the way round the seal circumference. The leaves give the seal a low stiffness, and are packed together such that the total leakage through the seal is reduced. Nonetheless, interleaf gaps do provide the seal with a porous aerodynamic working section. Such seals may be used, for example, in gas turbine engines.

Figure 1:
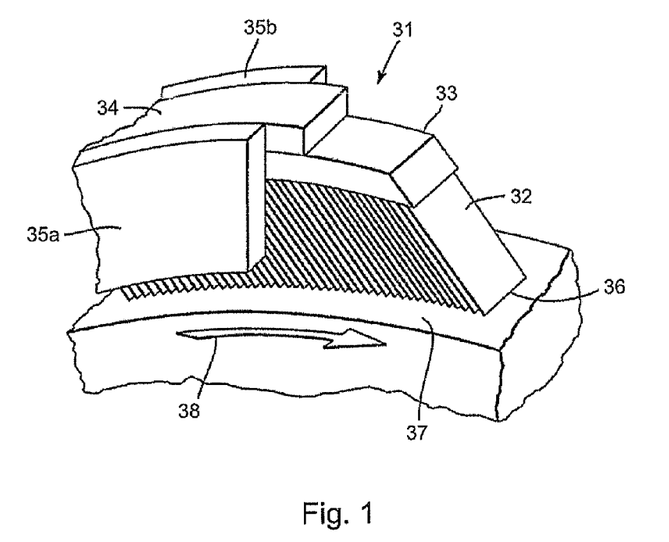
FIG. 1 shows schematically a cut-away perspective view of a portion of a leaf seal.
Figure 2:
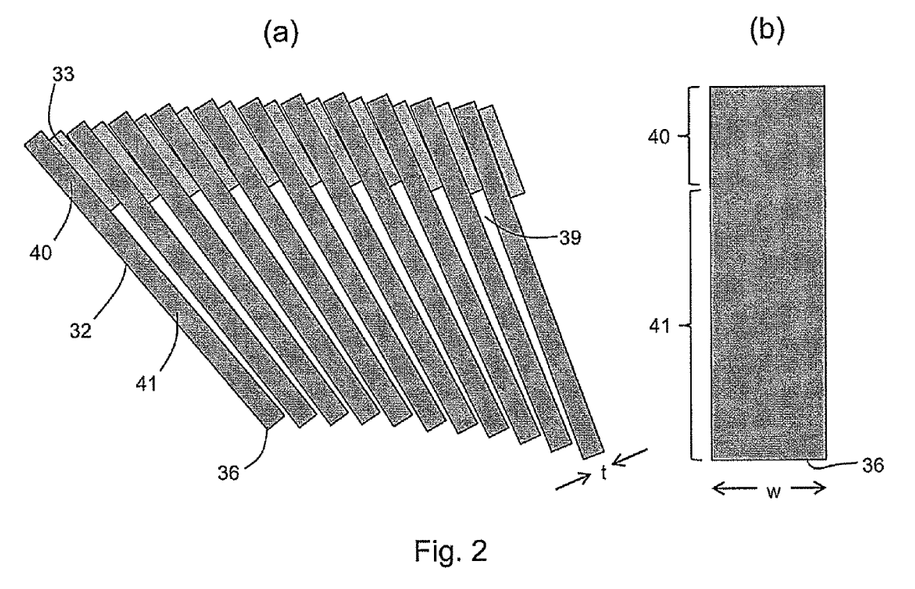

FIG. 1 shows schematically a cut-away perspective view of a portion of a leaf seal 31 comprising a pack of leaves 32. FIG. 2 shows (a) a view along the axial direction of an arc segment of the pack to better show some of the leaves 32 edge-on, and (b) a plan view of a single leaf 32.

The leaves 32 each have a root portion 40 and a working portion 41, and have a width w in the axial direction and a thickness t. The leaves alternate with spacer elements 33 at their root portions 40, and are secured thereat to a backing ring 34 of a housing, which typically also comprises front 35a (high pressure side) and rear (low pressure side) 35b rigid coverplates. The working portions 41 of the leaves 32 present end edges 36 towards a surface 37 of a rotating component generally rotating in the direction depicted by arrowhead 38. The leaves 32, and in particular the end edges 36 of the leaves 32, act against the surface 37 in order to create a seal across the assembly 31. Each leaf 32 is sufficiently compliant in order to adjust with rotation of the surface 37, so that a good sealing effect is created. The spacers 33 ensure that flexibility is available to appropriately present the leaves 32 towards the surface 37 which, as illustrated, is generally with an inclined angle between them. The spacers 33 also help to form interleaf gaps 39 between adjacent working portions 41 of the leaves 32. A leakage flow through these gaps 39 is induced by the pressure differential across the seal.

SUMMARY OF THE INVENTION

An aim of the present invention is to provide a leaf seal with improved performance and/or reliability.

In a first aspect, the present invention provides a leaf seal for effecting a seal between two, coaxial, relatively rotating components, the leaf seal having an annular pack of stacked leaves, the pack being mountable to a first one of the components with interleaf gaps formed between working portions of neighbouring leaves and the leaves extending towards the other component such that end edges at ends of the leaf working portions are presented for wiping contact with the other component and, in use, a pressure drop is maintained axially across the pack;

wherein, at least adjacent its end edge, each leaf has a rear section at or adjacent the low pressure side of the pack and a front section which extends from the rear section to the high pressure side of the pack, the rear sections of the leaves being thicker than their respective front sections to reduce the interleaf gaps at the rear sections such that most of the pressure drop across the pack is over the rear sections.

In a conventional leaf seal, such as that shown in FIGS. 1 and 2, the interleaf gaps are constant in the axial direction of the seal. This typically leads to a pressure on the surfaces of the leaves which drops gradually from the high pressure to the low pressure side of the pack. However, such a gradual pressure drop can drive aeroelastic instabilities, which can in turn cause leaf damage. Also, the gradual pressure drop can contribute to undesired leaf blow-down.

In contrast, in the present invention, the reduced interleaf gaps at the rear sections of the leaves cause most of the pressure drop across the pack to be over those rear sections. By concentrating the pressure drop at this location aeroelastic instabilities can be eliminated or reduced. Leaf blow-down can also be eliminated or reduced.

In addition, the thickness variation of the leaves is consistent with operational forces acting on the leaves. More particularly, in use the leaves experience bending forces in the axially rearwards direction due to the pressure drop across the pack. These forces put the leaves into tension at the high pressure side of the pack. The front sections are less thick than the rear sections but can nonetheless resist this tension. If the pressure drop were alternatively carried at the front of each leaf by a thicker front section, then a thinner rear section at the rear of each leaf would have to support compressive loads, which could result in buckling.

In a second aspect, the present invention provides a gas turbine engine, such as an aero gas turbine engine, having one or more leaf seals according to the first aspect.

Optional features of the invention will now be set out. These are applicable singly or in any combination with any aspect of the invention.

The components can be a rotor shaft and a casing for the shaft. Typically, the or each pack is mounted to the radially outer component.

Each rear section may extend forward from the low pressure side of the pack over a distance of at most one third or at most one quarter of the axial width of the leaf. This helps to further concentrate the pressure drop.

Each rear section may extend forward from the low pressure side of the pack over a distance of at least 5% or 10% of the axial width of the leaf. In this way, over-concentration of the pressure drop, which can lead to excessive stress in the rear section, can be avoided.

Generally, the rear section may extend forward from the low pressure side of the pack over a distance of up to 3 or 2 mm, with about 1 mm being typical. The front section may extend from the rear section to the high pressure side of the pack over a distance of up to 3 to 6 mm.

At least 80%, 90%, or substantially all, of the pressure drop across the pack can be over the rear sections.

The working portion of each leaf generally has a front edge at the high pressure side of the pack. The front section may be cut away at the high pressure side adjacent the end edge such that the front edge meets the end edge at an internal angle greater than 90°, and preferably greater than 120°. As the cut away portion of the front section typically contributes little to the axial stiffness of the leaf, the weight of the seal may be reduced in this way.

The rear section of each leaf may have a substantially uniform thickness with radial distance from the end edge, or may increase in thickness with radial distance from the end edge. Additionally or alternatively, the front section of each leaf may have a substantially uniform thickness with radial distance from the end edge, or may increase in thickness with radial distance from the end edge.

The rear section of each leaf may have a substantially uniform thickness with axial distance, or may increase in thickness with axial distance in the direction from the high to the low pressure side of the pack. Additionally or alternatively, the front section of each leaf may have a substantially uniform thickness with axial distance, or may increase in thickness with axial distance in the direction from the high to the low pressure side of the pack.

The rear section of each leaf may have a curved rear edge. The front section of each leaf may have a curved front edge. A boundary between the front and the rear section of each leaf may be curved. In each case, the convex side of the respective curved edge can be facing towards the high pressure side of the pack.

The front and rear sections may occupy the entire working portion of each leaf, i.e. so that a boundary between the sections extends radially from the end edge to a root portion of the leaf. Alternatively, however, the front and rear sections may occupy only a part of the working portion, for example at the end edge of the leaf. The remainder of the working portion may then have little leakage flow thereacross, and can be the same thickness as the rear section from the front to the rear edge of the leaf. In either alternative, the ratio of the axial widths of the front and rear sections may be constant or may vary with radial distance.

In respect of each leaf, the front section may have one or more contact zones, each contact zone, in use, making contact with a neighbouring leaf. The contact zones can improve leaf-to-leaf support and/or leaf damping.

Each front section may contain one or more through holes. These can encourage pressure equalisation across opposing sides of the front section, and thereby further discourage leaf blow-down.

The leaf seal may further have a front coverplate at the high pressure side of the pack, the front coverplate covering a portion of the radial extent of the pack. The leaf seal may further have a rear coverplate at the low pressure side of the pack, the rear coverplate covering a portion of the radial extent of the pack.

The rear and front sections of each leaf may form substantially the entire working portion of the leaf. However, particularly when there is little pressure drop across the seal at locations distal from the end edges (e.g. due to the presence of a rear coverplate which is closely axially spaced from the low pressure side of the pack), the rear and front sections of each leaf may form only a part of the working portion which is adjacent the end edge. The rest of the working portion can then be, for example, the same thickness as the rear section.

The leaf seal can be used, for example, in gas and steam turbines, and jet engines. However, it may also be used in other applications, e.g. where sealing between a high and low pressure region is required along a shaft.

Further optional features of the invention are set out below.

BRIEF DESCRIPTION OF THE DRAWINGS

Embodiments of the invention will now be described by way of example with reference to the accompanying drawings in which:

FIG. 2 shows (a) a view along the axial direction of an arc segment of the pack of leaves of the seal of FIG. 1, and (b) a plan view of a single leaf of the seal of FIG. 1;

FIGS. 18(*a*) to (*f*) show various possibilities for leaf cross-sections;

FIG. 22 shows (a) a plan view of the working portion of a leaf with front and rear sections limited to about the final third of the working portion, and (b) a two-leaf arc segment of the working section of a leaf pack formed by such working portions;

FIG. 25 shows (a) a plan view of the working portion of a leaf in which the rear section varies in thickness along the portion, and (b) a two-leaf arc segment of the working section of a leaf pack formed by such working portions.

DETAILED DESCRIPTION AND FURTHER OPTIONAL FEATURES OF THE INVENTION

Figure 3:
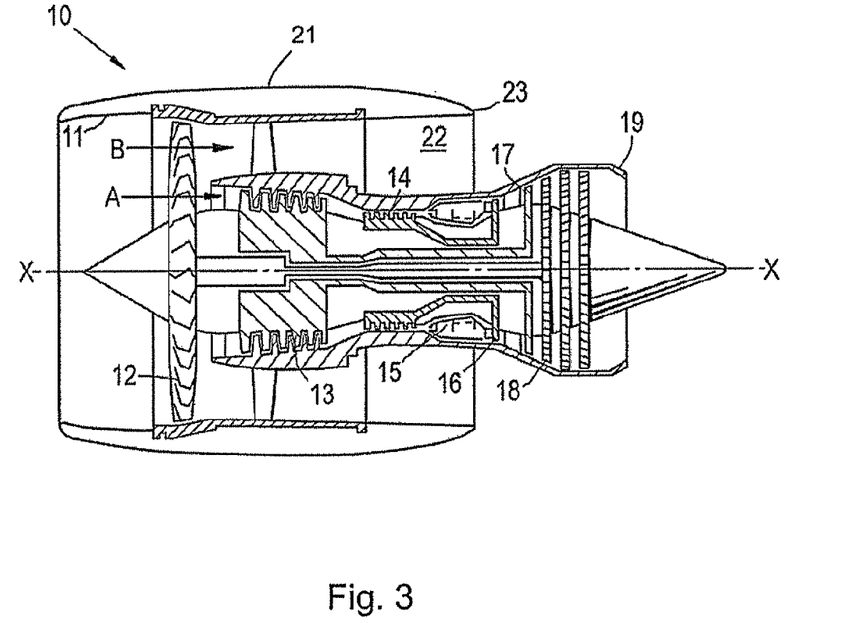
FIG. 3 shows schematically a longitudinal section through a gas turbine engine.

With reference to FIG. 3, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The engine may have one or more leaf seals installed, for example, between an interconnecting shaft and a casing for the shaft.

Figure 4:
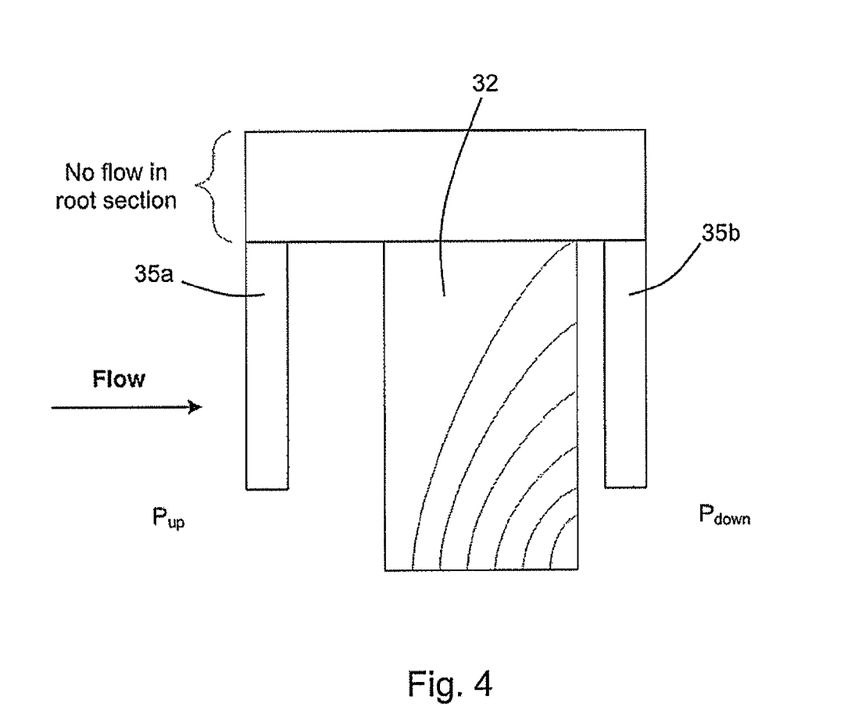
FIG. 4 shows schematically a longitudinal cross-section through the conventional leaf seal of FIGS. 1 and 2, and illustrates typical contours of equal pressure in an interleaf gap.

FIG. 4 shows schematically a longitudinal cross-section through the conventional leaf seal of FIGS. 1 and 2, and illustrates typical contours of equal pressure in the interleaf gap.

The pressure field producing these contours can drive aeroelastic instabilities.

Figure 5:
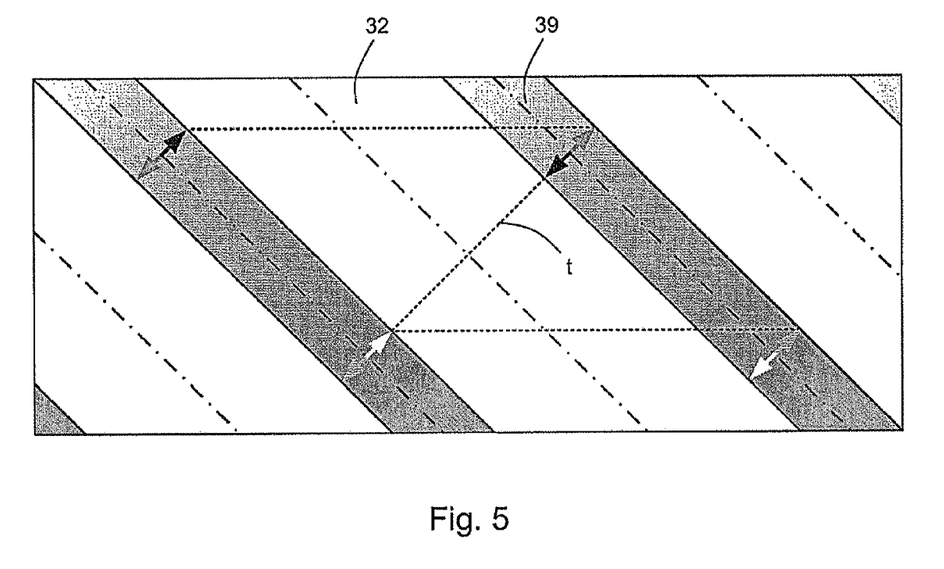
FIG. 5 shows schematically a transverse cross-section through parts of three adjacent leaves of a conventional leaf seal to illustrate pressure mismatch across the thickness t of a leaf.

In addition, a significant contribution to blow-down originates from pressure mismatch across the thickness t of a leaf (see Franceschini, G., Jones, T. V., and Gillespie, D. R. H., *Improved Understanding of Blow-Down in Filament Seals*, Journal of Turbomachinery 132 (2010) 041004, TURBO-09-1028, and Franceschini, G., Jones, T. V., and Gillespie, D. R. H., *Improved Understanding of Blow-Down in Filament Seals*, in ASME Turbo Expo 2008: Power for Land, Sea and Air, Berlin, Germany, 2008, ASME, GT2008-51197.) This is illustrated in FIG. 5. The radial pressure gradient in the interleaf gaps 39, with higher pressure (lighter grey) at the leaf roots and lower pressure (darker grey) at the end edges, creates a pressure mismatch across the thickness t of a leaf which is canted at an angle to the radial. This mismatch produces a blow-down bending moment which leads to physical blow-down of the leaves 32.

Figure 6:
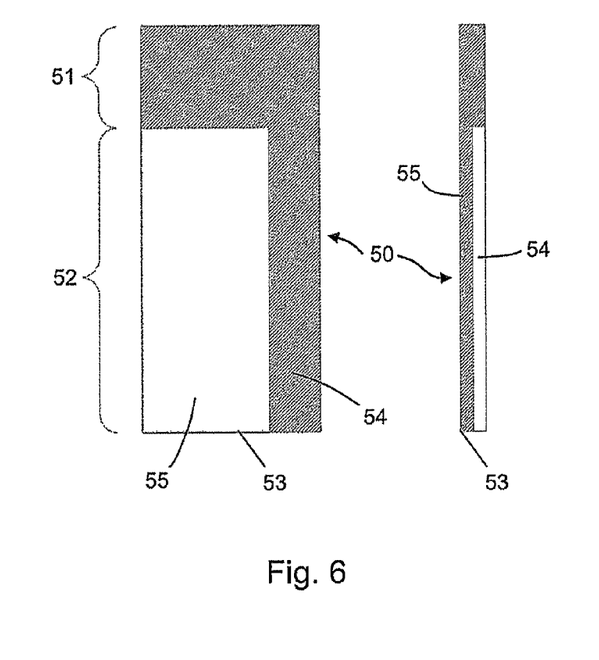
FIG. 6 shows plan (left) and edge-on (right) views of a leaf for a leaf seal according to the present invention.

FIG. 6 shows plan (left) and edge-on (right) views of a leaf 50 for a leaf seal according to the present invention. The leaf has a root portion 51, a working portion 52 and an end edge 53. A rear section 54 of the working portion is located at the low pressure side of the leaf seal pack, and a front section 55 of the working portion extends from the rear section to the high pressure side, the two sections 54, 55 together forming the entire working portion 52. The root portion 51 and rear section 54 are of uniform thickness and are thicker than the front section 55. The reduced thickness of the front section can be produced, for example, by etching. Other possible forming techniques are discussed below.

Figure 7:
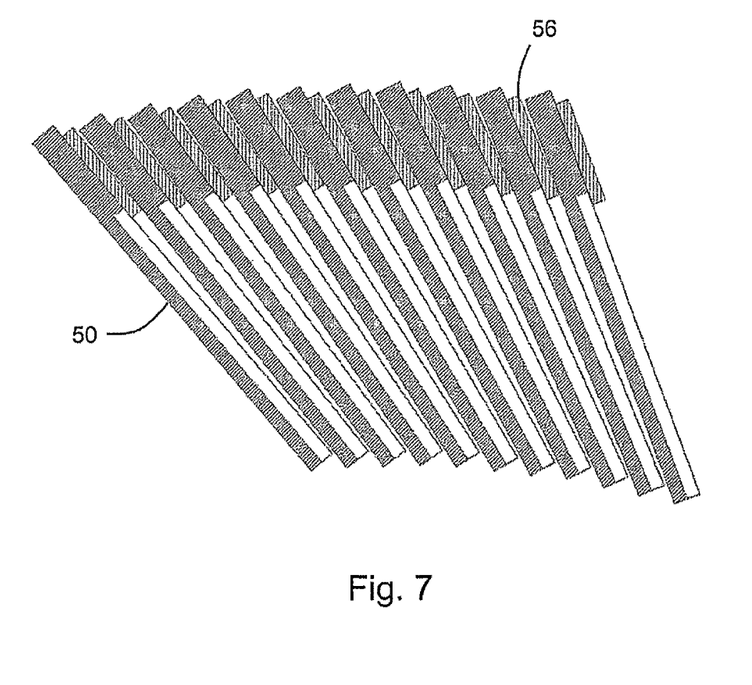
FIG. 7 shows a view along the axial direction, from the high pressure side of the seal, of an arc segment of a leaf pack formed by leaves of the type shown in FIG. 6.
Figure 8:
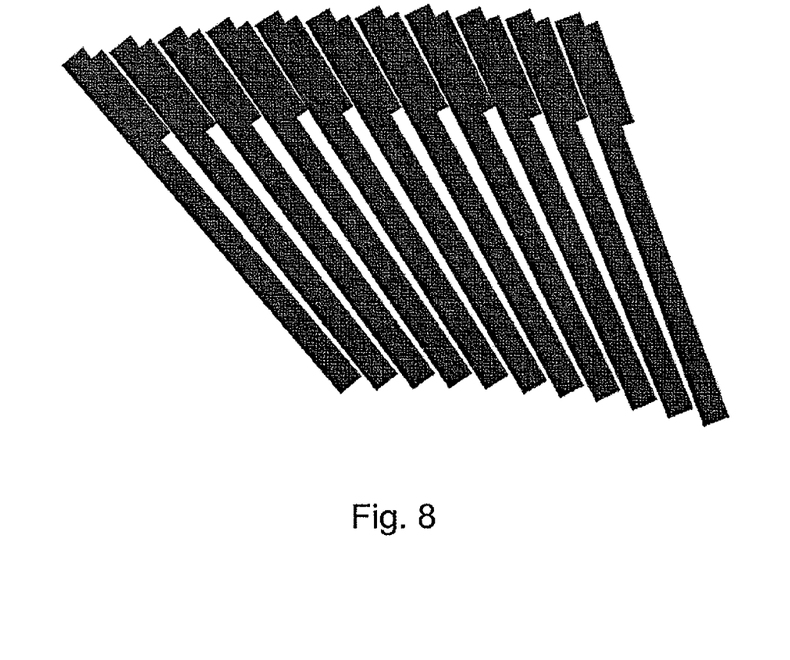
FIG. 8 shows a silhouette corresponding to the view of FIG. 7 from a cross-section at rear sections of the leaves.
Figure 9:
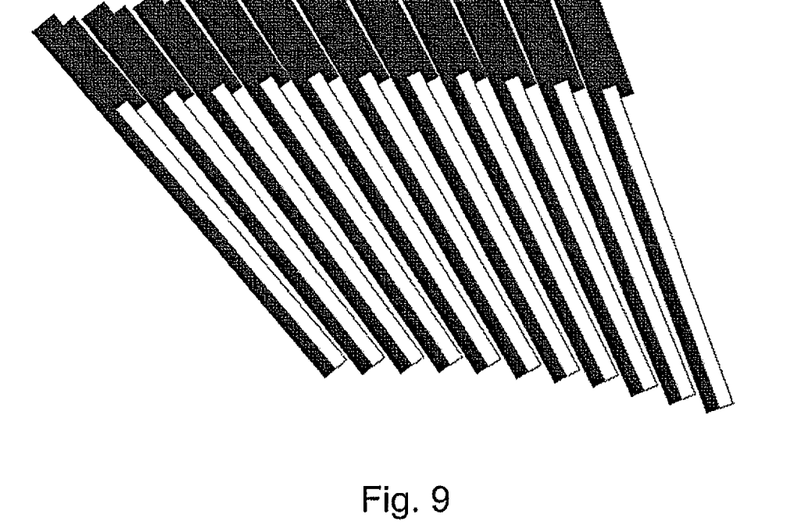
FIG. 9 shows a silhouette corresponding to the view of FIG. 7 from a cross-section at front sections of the leaves.

FIG. 7 shows a view along the axial direction, from the high pressure side of the seal, of an arc segment of a leaf pack formed by leaves 50 of the type shown in FIG. 6, spacers 56 alternating with the root potions 51 of the leaves. The greater thickness of the rear sections 54 produces an increased flow restriction in the interleaf gaps at the rear sections compared to the relatively unblocked flow at the front sections 55. This is illustrated in FIGS. 8 and 9 which are silhouettes corresponding to the view of FIG. 7 from cross-sections at respectively the rear and the front sections.

Figure 10:
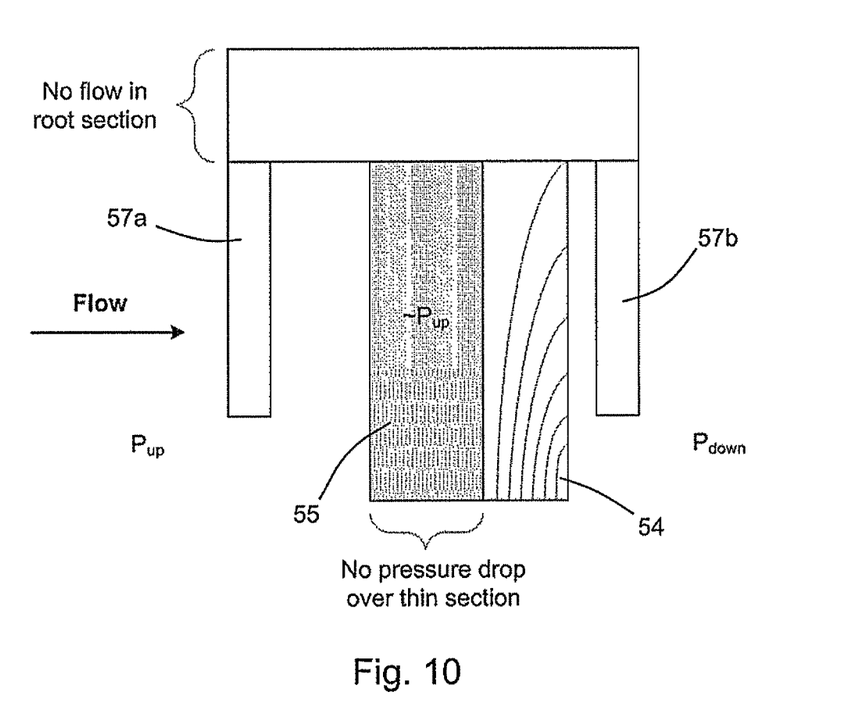
FIG. 10 shows schematically a longitudinal cross-section through a leaf seal formed using the leaves of FIG. 6, and illustrates typical contours of equal pressure in the interleaf gaps over the rear sections of the leaves.

FIG. 10 shows schematically a longitudinal cross-section through a leaf seal formed using the leaves of FIG. 6, the seal having front 57*a* and rear 57*b* coverplates. Typical contours of equal pressure in the interleaf gaps over the rear sections 54 are illustrated. The pressure drop across the leaf pack is thus concentrated across the rear sections 54 while the pressure over the front sections 55 is substantially at the upstream pressure. There is, therefore, little or no pressure mismatch and hence little or no loading across the front sections 55. The primary function of the front sections 55 is to create axial rigidity (or stiffness) for the rear sections 54.

Figure 11:
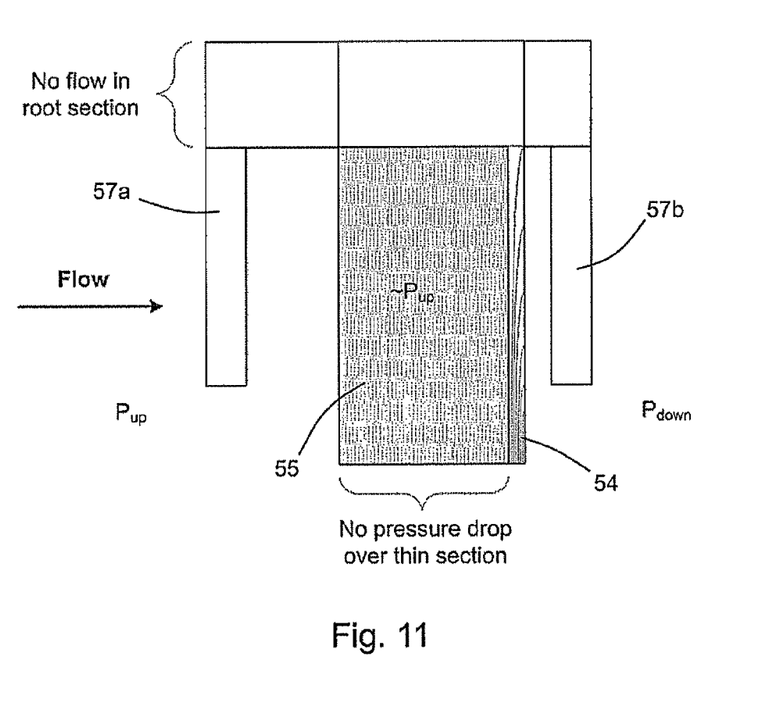
FIG. 11 shows schematically a longitudinal cross-section corresponding to FIG. 10 but with the rear sections extending over a reduced proportion of the axial width of the leaves.

FIG. 11 shows schematically a longitudinal cross-section through another leaf seal formed using leaves in which the rear sections 54 extend over a much reduced proportion of the axial width of the leaves. Again, contours of equal pressure in the interleaf gaps over the rear sections 54 are illustrated. The pressure over the enlarged front sections 55 is still substantially at the upstream pressure. The pressure drop thus occurs over a much shorter axial distance at the rear of the leaves. This restricted space pressure drop reduces the net forces across the leaves yet further.

Figure 12:
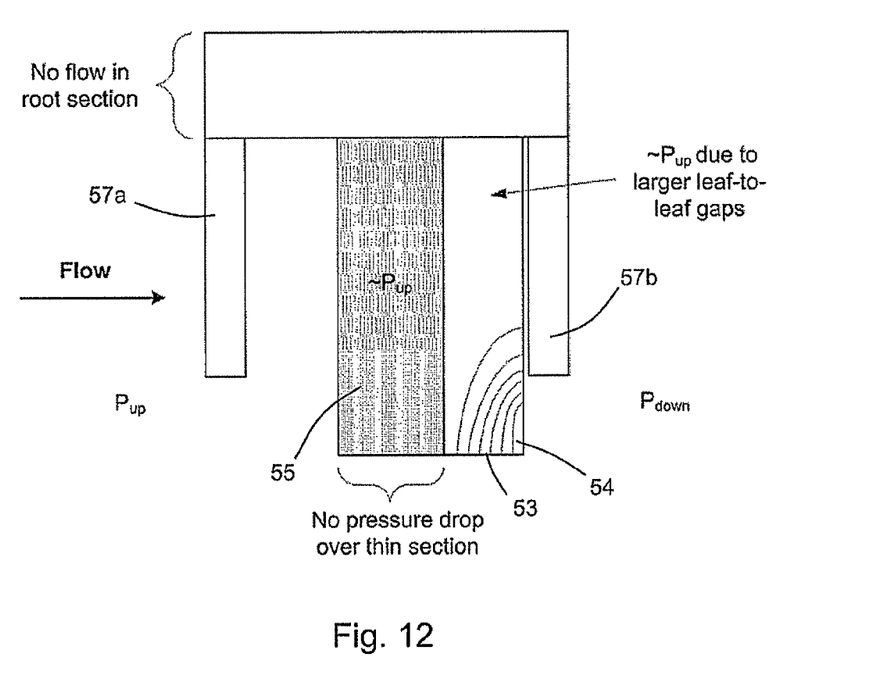
FIG. 12 shows schematically a longitudinal cross-section corresponding to FIG. 10 but with the rear coverplate brought closer to the rear of the leaf pack.

If the rear coverplate 57*b* is brought closer to the rear of the leaf pack, then the equal pressure contours are shown as in FIG. 12. The rear coverplate introduces a further blockage at the root ends of the working portions of the leaves. The flow exit from the leaf pack is now localised at the rear corners of the leaves under the cover plate. The pressure drop is thus not only restricted to the rear section 54, but also to the part of that section adjacent the end edge 53.

Figure 13:
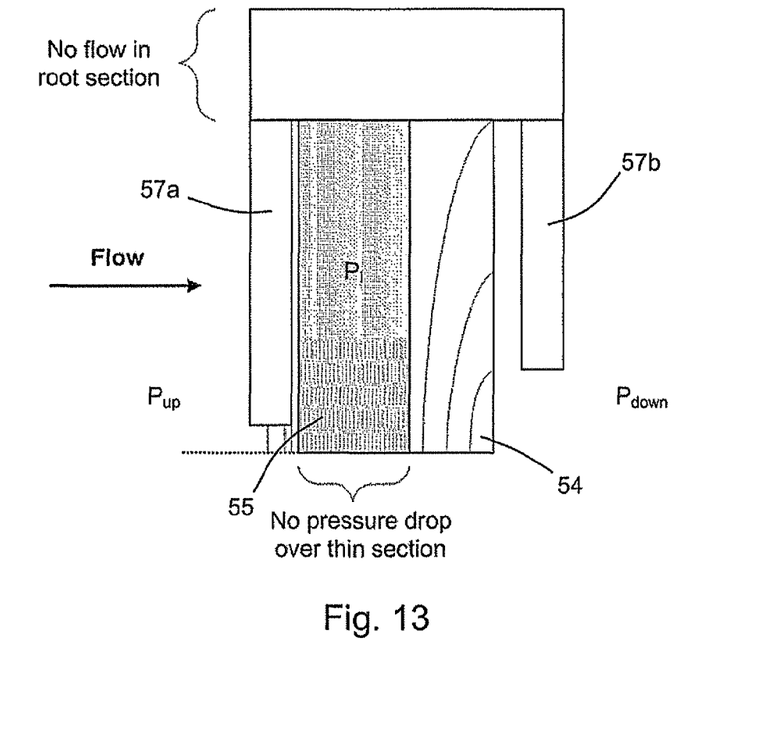
FIG. 13 shows schematically a longitudinal cross-section corresponding to FIG. 10 but with the front coverplate brought closer to the front of the leaf pack.

If the front coverplate 57*a* is brought closer to the front of the leaf pack, then the equal pressure contours are shown as in FIG. 13. The front coverplate causes a pressure drop across it so that the pressure over the front sections 55 is now at a reduced pressure relative to the high pressure on the upstream side of the seal. However, across the leaf pack, the pressure drop is still concentrated over the rear sections 54.

Figure 14:
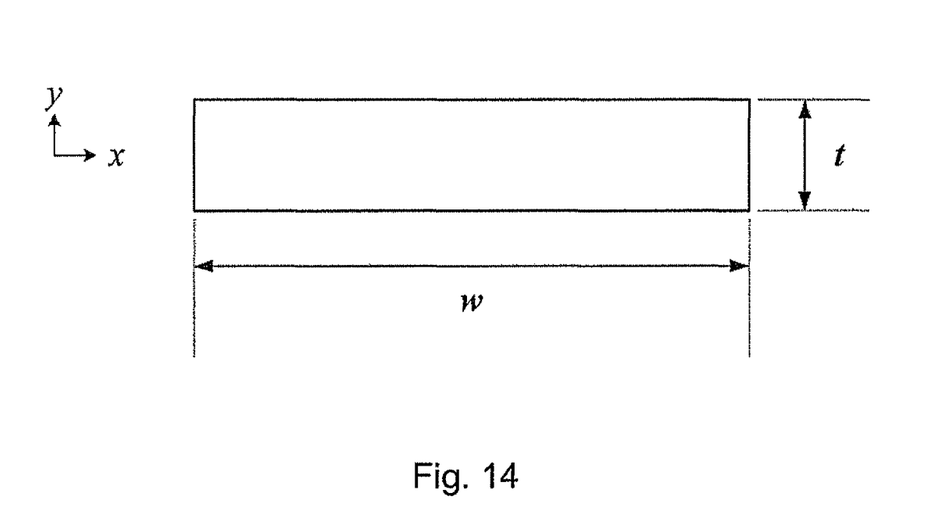
FIG. 14 shows schematically a cross-section through a conventional leaf.

Comparison of sectional modulii for axial and radial deflection shows that it is possible to thin the front section of a leaf and retain high axial stiffness whilst not compromising radial flexibility. In a conventional leaf seal the leaves are of generally rectangular section as shown in FIG. 14. The width w and thickness t are selected to provide radial flexibility whilst maintaining axial rigidity. More particularly, the sectional modulus $I_{xx}=wt^3/12$ is low and the sectional modulus $I_{yy}=w^3t/12$ is high to give a high value of $I_{yy}/I_{xx}=w^2/t^2$.

Figure 15:
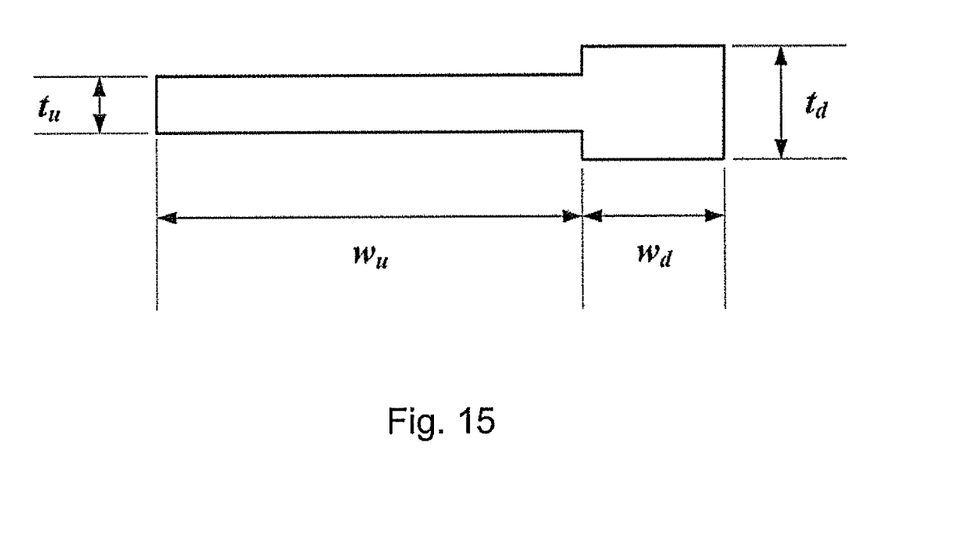
FIG. 15 shows schematically a cross-section through a leaf according to the present invention.

In a leaf according to the present invention, as shown in FIG. 15, the width of the front section of the leaf is $w_u$, the thickness of the front section of the leaf is $t_u$, the width of the rear section of the leaf is $w_d$, the thickness of the rear section of the leaf is $t_d$. The ratio of $I_{yy}/I_{xx}$ is as follows:

$$\frac{I_{yy}}{I_{xx}} = \frac{t_d \cdot w_d^3 + 3 \cdot t_d \cdot w_d \cdot w_u^2 + t_u \cdot w_u^3 + 3 \cdot t_u \cdot w_u \cdot w_d^2}{t_d^3 \cdot w_d + t_u^3 \cdot w_u}$$

and can be rewritten as:

$$\frac{I_{yy}}{I_{xx}} = \frac{w^2}{t^2} \cdot \left( \frac{\frac{t_d}{t} \cdot \left(\frac{w_d}{w}\right)^3 + 3 \cdot \frac{t_d}{t} \cdot \frac{w_d}{w} \cdot \left(\frac{w_u}{w}\right)^2 +}{\frac{t_u}{t} \cdot \left(\frac{w_u}{w}\right)^3 + 3 \cdot \frac{t_u}{t} \cdot \frac{w_u}{w} \cdot \left(\frac{w_d}{w}\right)^2} \middle/ \left(\frac{t_d}{t}\right)^3 \cdot \frac{w_d}{w} + \left(\frac{t_u}{t}\right)^3 \cdot \frac{w_u}{w} \right)$$

Clearly for $t_u = t_d = t$ then the ratio of sectional modulii is equal that for the conventional rectangular case and the multiplier of $w_2/t_2$ above equals 1.

If $w_u/w = \frac{1}{2}$, $w_d/w = \frac{1}{2}$, $t_u/t = \frac{1}{2}$ and $t_d/t = 1$ then the multiplier becomes 4/3, which has improved the radial flexibility for a given axial rigidity (or improved the axial rigidity for a given radial flexibility). If $w_u/w = \frac{3}{4}$, $w_d/w = \frac{1}{4}$, $t_u/t = \frac{1}{2}$ and $t_d/t = 1$ then the multiplier becomes 23/11, which has an even greater potential for improving radial flexibility and axial rigidity. If $w_u/w = \frac{3}{4}$, $w_d/w = \frac{1}{4}$, $t_u/t = \frac{1}{4}$ and $t_d/t = 1$ then the multiplier becomes 148/67 which improves the ratio of sectional modulii even further.

Figure 16:
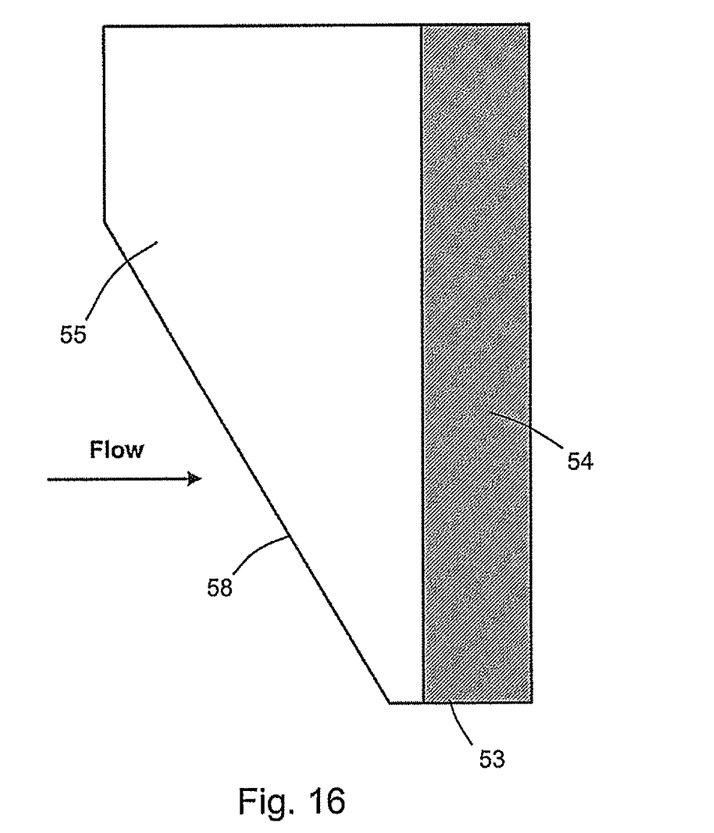
FIG. 16 shows a plan view of the working portion of a leaf with a removed front corner.
Figure 17:
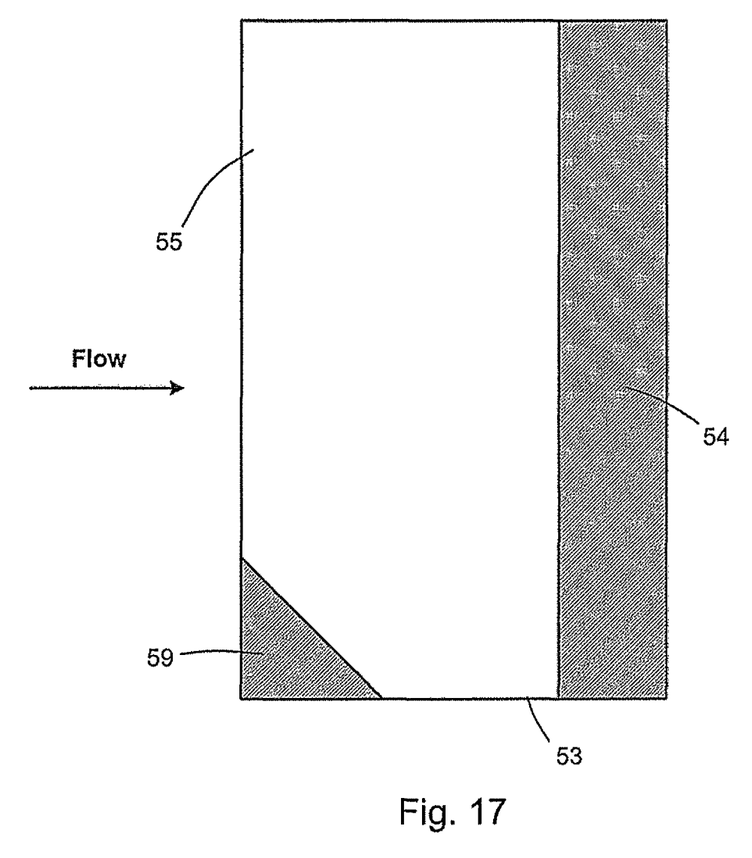
FIG. 17 shows a plan view of the working portion of a leaf with a thickened contact zone at the front corner.
Figure 18:
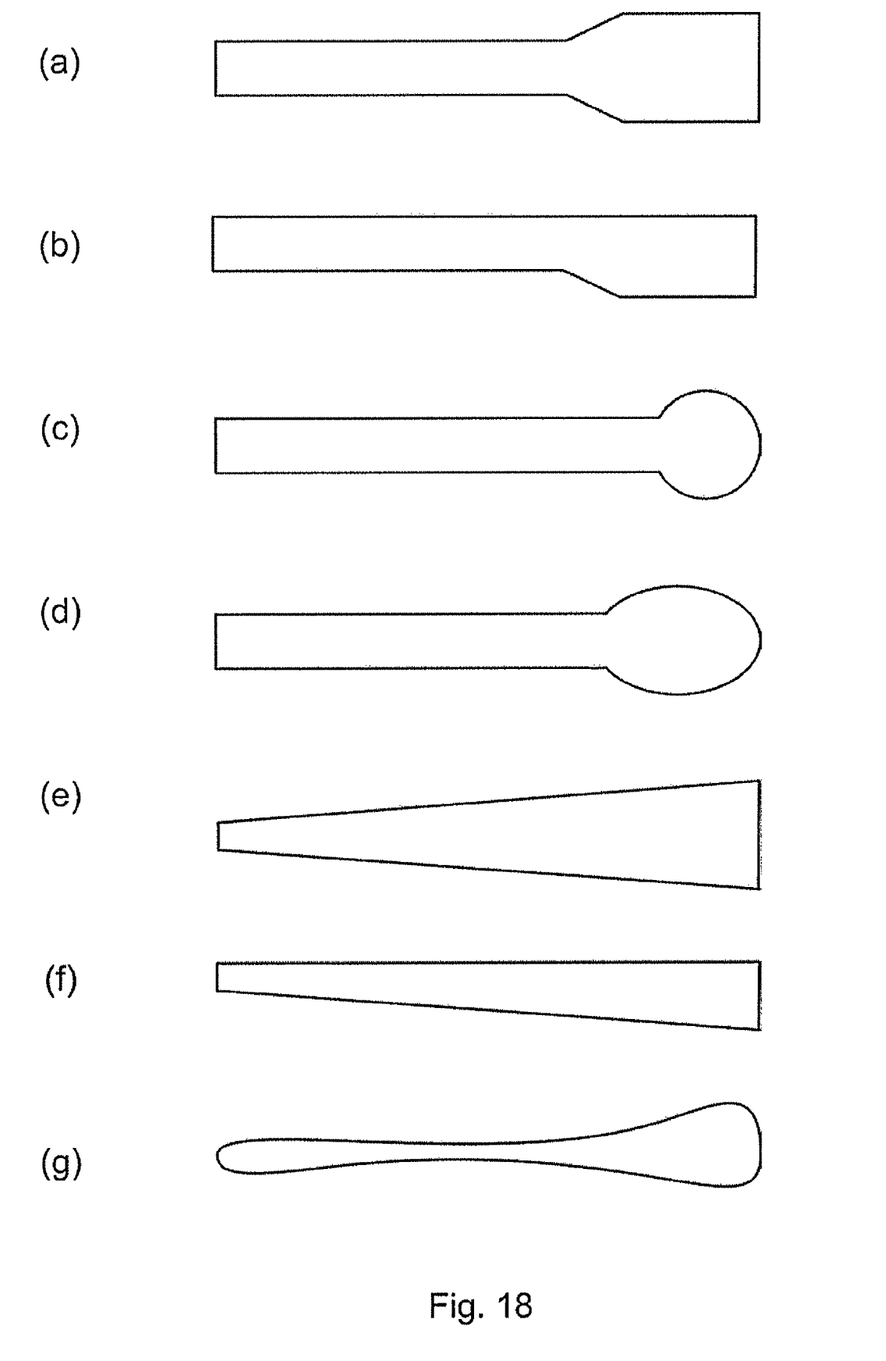

Thus, advantageously, the rear section 54 of the leaf, over which the pressure drop is concentrated, can be reduced in width to such an extent that blow-down induced by pressure mismatch and the forcing that creates aeroelastic instability may be substantially eliminated. The front section 55 of the leaf has little or no flow blocking functionality, but provides structural axial rigidity to support the short sealing width of the rear section. In this regard, the front corner of the front section adjacent the end edge 53 contributes little to the axial rigidity and so may be optionally removed, as shown in the leaf working portion of FIG. 16, which has front edge 58 which meets the end edge 53 at an internal angle which is greater than 90°. However, another option is to introduce one or more contact zones 59 into this region (e.g. by locally thickening the front section) for additional contact between leaves to create circumferential leaf-to-leaf support and/or to improve leaf damping, as shown in the leaf working portion of FIG. 17. The contact zone can take the form, for example, of a raised front corner of the front section.

Different leaf cross-sections can be used to create the defined pressure drop at the rear section of the leaf. FIGS. 18(a) to (f) show various possibilities. The leaf can be symmetric in cross-section, as shown for example in FIGS. 18(a) and (c) to (e), or non-symmetric, as shown for example in FIGS. 18(b), (f) and (g). The cross-sectional shapes can be created by a wide variety of manufacturing means including etching, machining, rolling, extruding, grinding, ablation, spark eroding, powder deposition, physical vapour deposition, metal injection moulding, stamping, coining or forging. The increased thickness of the rear section can be produced by folding over part of a leaf pre-form of uniform thickness on itself. The increased thickness of the rear section can be produced by attaching a separate part using brazing, welding or bonding. Another option is to form the front and rear sections separately and then weld them together.

Figure 19:
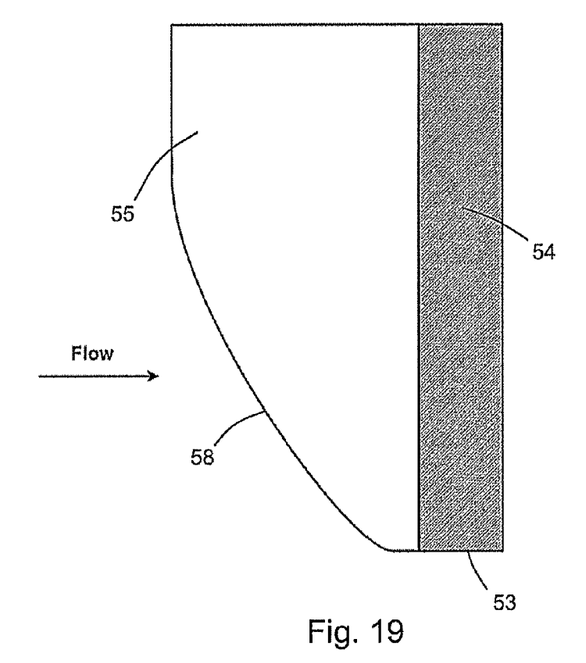
FIG. 19 shows a plan view of the working portion of a leaf with a curved front edge.
Figure 20:
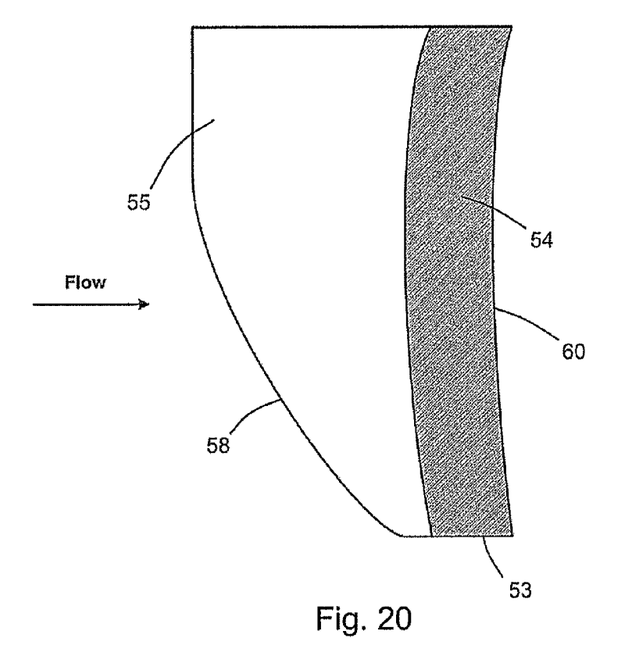
FIG. 20 shows a plan view of the working portion of a leaf with a curved front and rear edges.
Figure 21:
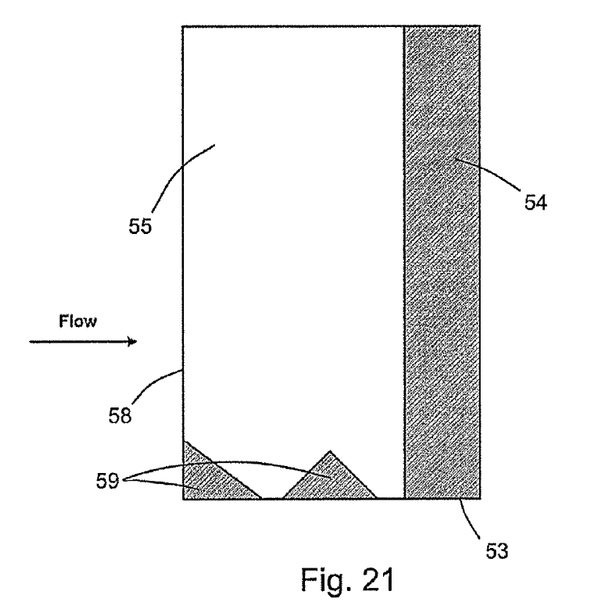
FIG. 21 shows a plan view of the working portion of a leaf with two contact zones at the end edge.
Figure 22:
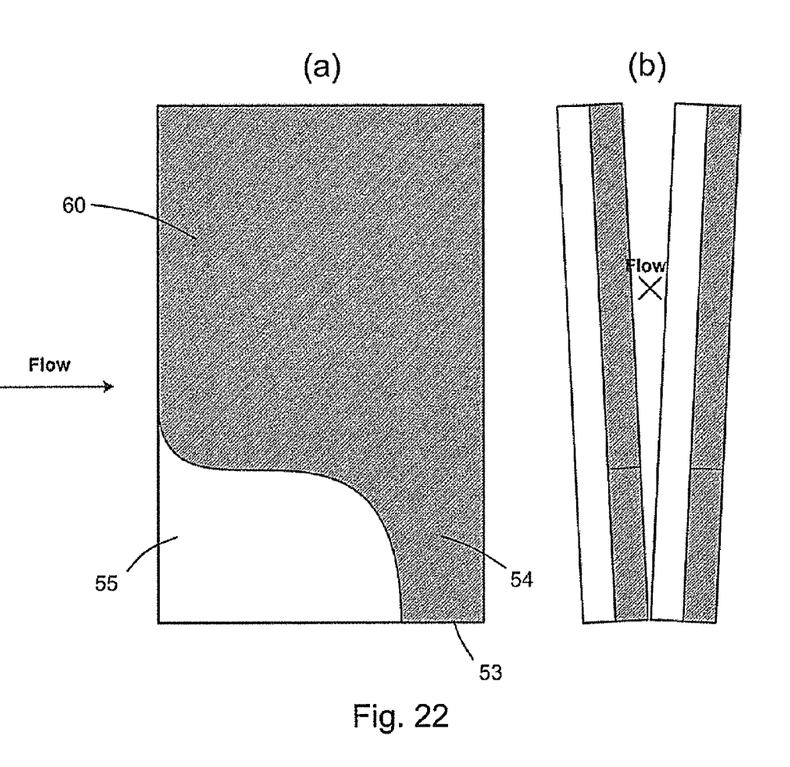
Figure 23:
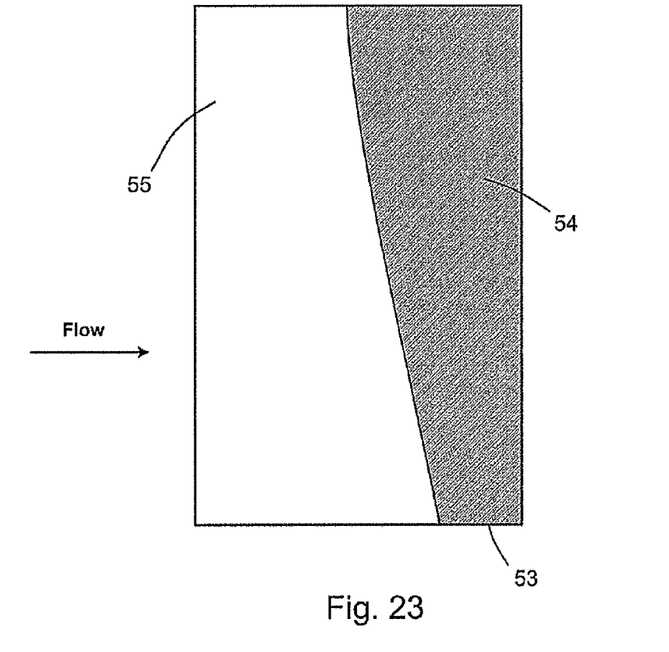
FIG. 23 shows a plan view of the working portion of a leaf in which the rear section varies in width along the portion.
Figure 24:
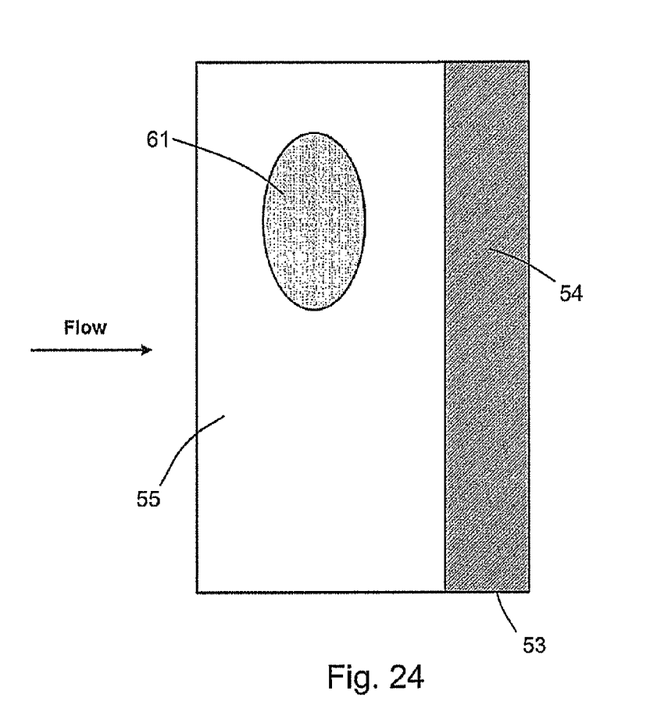
FIG. 24 shows a plan view of the working portion of a leaf in which the front section contains a through-hole or holes.
Figure 25:
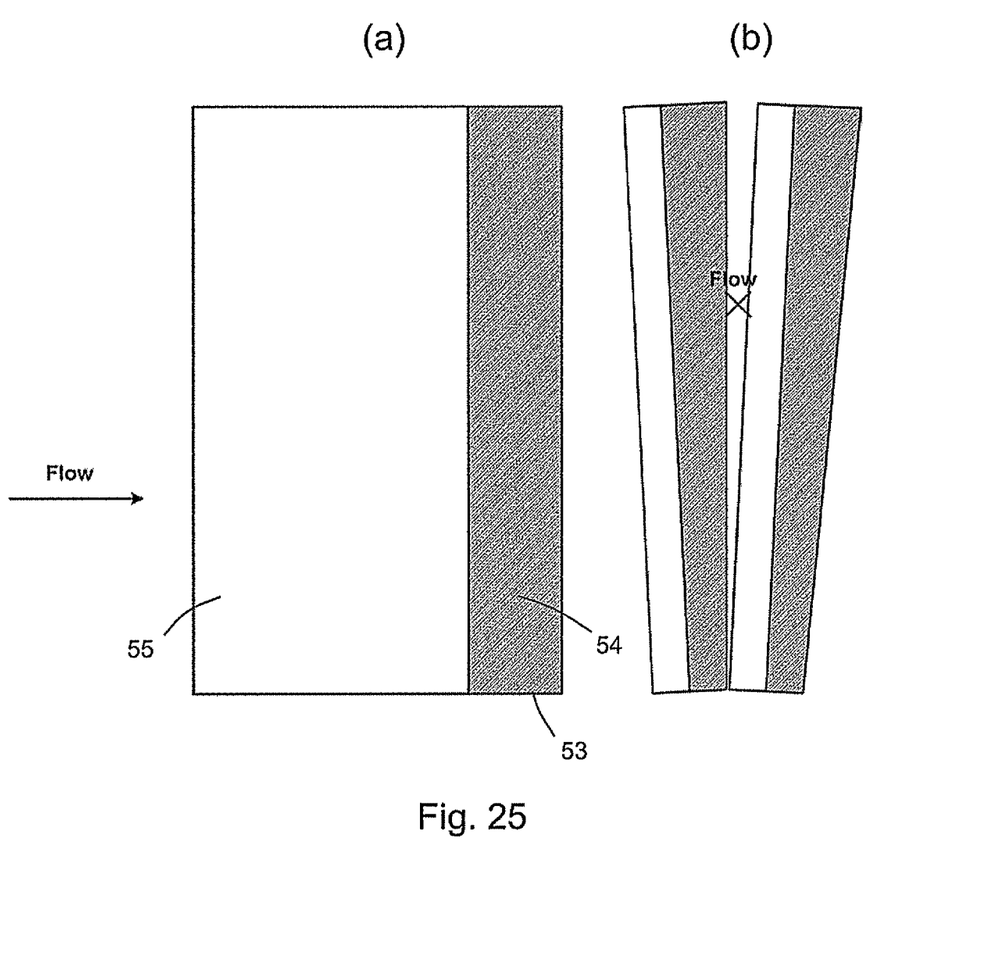

The working portion of the leaf can be configured in various ways. FIG. 19 shows a working portion with a curved front edge 58 rather than the straight-lined cut away front edge of FIG. 16. The curved front edge can provide additional strength benefits. FIG. 20 shows a working portion with curved front 58 and rear 60 edges, and also a curved boundary between the front 55 and rear 54 sections. FIG. 21 shows a working portion with two contact zones in the front section 55 along the end edge 53. Such zones can also be along the front edge 58, in the centre of the front section, or some combination of these. The zone shapes can be elongate or of approximately unitary aspect ratio (e.g. squares or circles). The zones can give leaf-to-leaf support without affecting the pressure over the front section. FIG. 22(a) shows a working portion in which the front 55 and rear 54 sections form only about one third of the working portion. The remainder 60 of the working portion may have little leakage flow thereacross (e.g. due to the presence of coverplates) as indicated in FIG. 22(b). The remainder may, therefore, have the same thickness as the rear section. FIG. 23 shows a working portion in which the rear section 54 varies in width from the end edge 53 to the root. FIG. 24 shows a working portion in which the front section 55 contains a through-hole or holes 61. Such holes encourage pressure equalisation over the front section, making it more difficult for pressure differences to occur on opposite sides of the front section. FIGS. 25(a) and (b) show a working portion in which the rear section 54 increases in thickness from the end edge 53 to the root. Further options are to vary the thickness of the front section in a similar manner, or to vary the thicknesses of both sections. The various configurations discussed above may be combined, as appropriate.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A leaf seal for effecting a seal between two, coaxial, relatively rotating components, the leaf seal having an annular pack of stacked leaves, the pack being mountable to a first one of the components with interleaf gaps formed between working portions of neighboring leaves and the leaves extending towards the other component such that end edges at ends of the leaf working portions are presented for wiping contact with the other component and, in use, a pressure drop is maintained axially across the pack;
   wherein the end edge at the end of the leaf working portions of each leaf has a rear section at or adjacent a low pressure side of the pack and a front section that extends from the rear section to a high pressure side of the pack, the rear sections of the leaves being thicker than their respective front sections to reduce the interleaf gaps at the rear sections such that most of the pressure drop across the pack is over the rear sections.

2. A leaf seal according to claim 1, wherein each rear section extends forward from the low pressure side of the pack over a distance of at most one third of the axial width of the leaf.

3. A leaf seal according to claim 1, wherein each rear section extends forward from the low pressure side of the pack over a distance of at least 5% of the axial width of the leaf.

4. A leaf seal according to claim 1, wherein at least 80% of the pressure drop across the pack is over the rear sections.

5. A leaf seal according to claim 1, wherein, in respect of each leaf, the working portion has a front edge at the high pressure side of the pack, the front section being cut away at the high pressure side adjacent the end edge such that the front edge meets the end edge at an internal angle greater than 90°.

6. A leaf seal according to claim 1, wherein the rear section of each leaf increases in thickness with radial distance from the end edge.

7. A leaf seal according to claim 1, wherein the rear section of each leaf increases in thickness with axial distance in the direction from the high to the low pressure side of the pack.

8. A leaf seal according to claim 1, wherein the rear section of each leaf has a curved rear edge.

9. A leaf seal according to claim 1, wherein a boundary between the front and the rear section of each leaf is curved.

10. A leaf seal according to claim 1, wherein, in respect of each leaf, the front section has one or more contact zones, each contact zone, in use, making contact with a neighbouring leaf.

11. A leaf seal according to claim 1, wherein each front section contains one or more through holes.

12. A leaf seal according to claim 1, wherein the leaf seal further has a front coverplate at the high pressure side of the pack, the front coverplate covering a portion of the radial extent of the pack.

13. A leaf seal according to claim 1, wherein the leaf seal further has a rear coverplate at the low pressure side of the pack, the rear coverplate covering a portion of the radial extent of the pack.

14. A leaf seal according to claim 1, wherein the rear and front sections of each leaf form substantially the entire working portion of the leaf.

15. A gas turbine engine having one or more leaf seals according to claim 1.

16. A leaf seal according to claim 1, further comprising a root portion, the root potion having a continuous thickness to an end portion of the leaf.

17. A leaf seal arrangement, comprising:
two, coaxial, relatively rotating components; and
a leaf seal having an annular pack of stacked leaves, the pack being mountable to a first one of the components with interleaf gaps formed between working portions of neighboring leaves and the leaves extending towards the other component such that end edges at ends of the leaf working portions are in wiping contact with the other component and, in use, a pressure drop is maintained axially across the pack,
wherein the end edge at the end of the leaf working portions of each leaf has a rear section at or adjacent a low pressure side of the pack and a front section that extends from the rear section to a high pressure side of the pack, the rear sections of the leaves being thicker than their respective front sections to reduce the interleaf gaps at the rear sections such that most of the pressure drop across the pack is over the rear sections.

* * * * *